(12) United States Patent
Ningthoujam (10) Patent No.: US 11,248,917 B2
(45) Date of Patent: Feb. 15, 2022

(54) METHOD, APPARATUS, AND COMPUTER PROGRAM PRODUCT FOR DETERMINING THE CRITICALITY OF AN EMERGENCY

(71) Applicant: HERE Global B.V., Eindhoven (NL)

(72) Inventor: Suresh Ningthoujam, Thane (IN)

(73) Assignee: HERE Global B.V., Eindhoven (NL)

( * ) Notice: Subject to any disclaimer, the term of this patent is extended or adjusted under 35 U.S.C. 154(b) by 59 days.

(21) Appl. No.: 16/211,877

(22) Filed: Dec. 6, 2018

(65) Prior Publication Data

US 2020/0182636 A1 Jun. 11, 2020

(51) Int. Cl.
*G01C 21/34* (2006.01)
(52) U.S. Cl.
CPC ..... *G01C 21/3415* (2013.01); *G01C 21/3492* (2013.01)
(58) Field of Classification Search
CPC .................. G01C 21/3415; G01C 21/3492
See application file for complete search history.

(56) References Cited

U.S. PATENT DOCUMENTS

| 5,012,221 | A | 4/1991 | Neuhaus et al. | |
|---|---|---|---|---|
| 9,278,689 | B1 | 3/2016 | Delp | |
| 9,672,719 | B1* | 6/2017 | Hollenstain | ............. H04W 4/00 |
| 2007/0018800 | A1* | 1/2007 | Boss | ....................... B60Q 9/008 |
| | | | | 340/435 |

| 2014/0303807 | A1* | 10/2014 | Addepalli | ............. H04W 48/18 |
|---|---|---|---|---|
| | | | | 701/1 |
| 2017/0236412 | A1* | 8/2017 | Gross | ..................... G08G 1/087 |
| | | | | 701/301 |
| 2018/0080779 | A1* | 3/2018 | Gordon | ............. B60W 30/0956 |

FOREIGN PATENT DOCUMENTS

| EP | 2 015 290 A1 | 1/2009 |
|---|---|---|
| IN | 267747 B | 7/2015 |
| JP | 2015 125253 A | 7/2015 |

OTHER PUBLICATIONS

Howard, C. Q. et al., *Acoustic Characteristics for Effective Ambulance Sirens*, Acoustics Australia, vol. 39, No. 2 (2011) pp. 43-53.

* cited by examiner

*Primary Examiner* — Peter D Nolan
*Assistant Examiner* — Ashley L Redhead, Jr.
(74) *Attorney, Agent, or Firm* — Alston & Bird LLP (57) ABSTRACT

A method, apparatus, and computer program product are provided to determine whether a vehicle should be re-routed in response to an emergency. In the context of a method, the determination is made by receiving an indication relating to a level of criticality of the emergency. This method also includes determining a projected route for an emergency vehicle servicing the emergency. The method further includes comparing the projected route of the emergency vehicle with a projected route of the vehicle. The method still further includes determining whether the projected route of the vehicle should be altered. In response to determining that the projected route of the vehicle should be altered, the method includes causing a signal to alter the projected route of the vehicle to be provided. A corresponding apparatus and computer program product are also provided.

23 Claims, 6 Drawing Sheets

METHOD, APPARATUS, AND COMPUTER PROGRAM PRODUCT FOR DETERMINING THE CRITICALITY OF AN EMERGENCY

TECHNOLOGICAL FIELD

An example embodiment relates generally to a method and associated apparatus and computer program product for routing a vehicle and, more particularly, to a method and associated apparatus and computer program product for determining whether a vehicle should be re-routed in response to an emergency.

BACKGROUND

Traditionally, whenever a driver hears a siren from a nearby emergency vehicle, the driver steers the vehicle to the side of the roadway and waits for the emergency vehicle to pass. This approach, for the most part, works in that the emergency vehicle gets the right of way. However, this approach may not be the best or most efficient way to have emergency vehicles and non-emergency vehicles interact on the roadway. For example, it can be difficult for the driver of a vehicle to determine whether the vehicle is in the path of the emergency vehicle and vehicles sometimes end up accidentally obstructing emergency vehicles. Additionally, the movement of vehicles to the side of the roadway to let emergency vehicles pass can lead to traffic congestion, thereby potentially making it harder, not easier for the emergency vehicles to get to its destination.

BRIEF SUMMARY

A method, apparatus, and computer program product are provided in accordance with an example embodiment in order to determine whether a vehicle should be re-routed in response to an emergency. With the increase in vehicle automation, ranging from driver assistance to fully autonomous vehicles, there is an opportunity for vehicles themselves to be more efficient in their operation and the manner in which vehicles interact. One way that this can be done is through advanced communication between different vehicles. Vehicles, such as ambulances, have long communicated with other vehicles, but the level of sophistication has been lacking. Vehicle automation presents an opportunity to increase the level of sophistication and thereby increase the reliability and efficiency of inter-vehicle interaction. The method, apparatus, and computer program product of the present disclosure help emergency vehicles, such as ambulances, fire trucks, police cars, and other first responders, to move through traffic more efficiently. Quick response times are imperative to emergency vehicles being as effective as possible.

The sirens on emergency vehicles serve the purpose of notifying drivers of nearby vehicles that an emergency vehicle is currently responding to an emergency situation. Currently, whenever a siren is heard, the standard response is usually to move out of the way, such as pulling to the side of the road. However, as vehicles are advancing technologically, the manner in which vehicles interact may also be improved. If, for instance, the vehicles receiving the siren can use information provided by the siren to determine the urgency of the situation, as well as the route of the emergency vehicle, then adjustments to the routes of the vehicles may be made that allow more efficient travel for all vehicles involved. Often drivers have difficulty determining the direction of the siren and therefore do not know the proper movement to make to assure that they are not in the path of the emergency vehicle. The method, apparatus, and computer program product of the present disclosure are configured to assist or supplant the driver in their response to a siren, such that the proper movement of the vehicle is made more frequently.

In this regard, the method, apparatus, and computer program product of an example embodiment permit the determination of whether a vehicle should be re-routed in response to an emergency. As such, the method, apparatus, and computer program product will use information provided by an emergency vehicle to determine the level of criticality and the proper adjustment to make to avoid obstructing an emergency vehicle. The information will, for example, be in the form of a siren. The siren may have a plurality of different digital channels that are selectively used based on the criticality of the emergency. Therefore, the vehicles near the emergency vehicle could discern the criticality level of the emergency from the siren, such as from the digital channel of the siren. Additionally, the vehicles may be equipped to determine the location of the emergency vehicle and a projected route for the emergency vehicle. Using the information, mixed with information relating to the vehicle's own projected route, the method, apparatus, and computer program product of an example embodiment can determine whether it is advisable that the vehicle alters its projected route to avoid getting in the way of the emergency vehicle. If it is determined that an alteration is advisable, a signal is then sent to the vehicle. The signal may be configured to cause a processor to alter the current route of an autonomous vehicles, or to communicate to the driver of a conventional, manually-operated vehicle that an alteration in route is advisable. This technique will help to prevent traffic congestion relating to emergency vehicles and help emergency vehicles reach their destinations faster.

In an example embodiment, a method is provided for determining whether a vehicle should be re-routed in response to an emergency. The method includes receiving an indication relating to a level of criticality of the emergency. The method also includes determining a projected route for an emergency vehicle servicing the emergency. The method further includes comparing the projected route of the emergency vehicle with a projected route of the vehicle. The method still further includes determining whether the projected route of the vehicle should be altered. In such a case, the determination is based on at least one of the level of criticality of the emergency, a location of the emergency vehicle, or the comparison of the projected route of the emergency vehicle and the projected route of the vehicle. In response to determining that the projected route of the vehicle should be altered, the method includes causing a signal to alter the projected route of the vehicle to be provided.

In an example embodiment, the method also includes altering the projected route of the vehicle in response to the signal. In some embodiments, the signal to alter the projected route of the vehicle is provided to a driver of the vehicle and includes at least one of a direction, a speed, or the projected route of the emergency vehicle. In various embodiments, the method also includes establishing the level of criticality of the emergency. In such embodiments, the level of criticality of the emergency is based on at least one of a severity of the situation, a destination of an emergency vehicle, or the projected route of the emergency vehicle.

In an example embodiment, the method also includes causing the vehicle to perform a predetermined movement in an instance in which the projected route of the emergency vehicle is unavailable. In some embodiments, receiving the indication of the level of criticality of the emergency includes receiving the indication through different digital channels based on the level of criticality of the emergency.

In another embodiment, an apparatus is provided that includes at least one processor and at least one memory including computer program code instructions with the computer program code instructions configured to cause the apparatus to determine whether a vehicle should be re-routed in response to an emergency. The computer program instructions are configured to, when executed, cause the apparatus to receive an indication relating to a level of criticality of the emergency. The computer program instructions are also configured to, when executed, cause the apparatus to determine a projected route for an emergency vehicle servicing the emergency. The computer program instructions are further configured to, when executed, cause the apparatus to compare the projected route of the emergency vehicle with a projected route of the vehicle. The computer program instructions are still further configured to, when executed, cause the apparatus to determine whether the projected route of the vehicle should be altered. Such determination is based on at least one of the level of criticality of the emergency, a location of the emergency vehicle, or the comparison of the projected route of the emergency vehicle and the projected route of the vehicle. In response to determining that the projected route of the vehicle should be altered, the computer program instructions are configured to, when executed, cause the apparatus to cause a signal to alter the projected route of the vehicle to be provided.

In an example embodiment, the computer program instructions are also configured to, when executed, cause the apparatus to alter the projected route of the vehicle in response to the signal. In some embodiments, the signal to alter the projected route of the vehicle is provided to a driver of the vehicle and includes at least one of a direction, a speed, or the projected route of the emergency vehicle. In an example embodiment, the computer program instructions are further configured to, when executed, cause the apparatus to establish the level of criticality of the emergency. In such an embodiment, the level of criticality of the emergency is based on at least one of a severity of the situation, a destination of an emergency vehicle, or the projected route of the emergency vehicle.

In an example embodiment, the computer program instructions are also configured to, when executed, cause the apparatus to perform a predetermined movement in an instance in which the projected route of the emergency vehicle is unavailable. In some embodiments, the received indication of the level of criticality of the emergency includes different digital channels based on the level of criticality of the emergency.

In yet another example embodiment, a computer program product is provided that includes at least one non-transitory computer-readable storage medium having computer-executable program code portions stored therein with the computer-executable program code portions including program code instructions configured to determine whether a vehicle should be re-routed in response to an emergency. The computer-executable program code portions include program code instructions configured to receive an indication relating to a level of criticality of an emergency. The computer-executable program code portions include program code instructions also configured to determine a projected route for an emergency vehicle servicing the emergency. The computer-executable program code portions include program code instructions further configured to compare the projected route of the emergency vehicle with a projected route of a vehicle. The computer-executable program code portions include program code instructions still further configured to determine whether the projected route of the vehicle should be altered. Such determination is based on at least one of the level of criticality of the emergency, a location of the emergency vehicle, or the comparison of the projected route of the emergency vehicle and the projected route of the vehicle. In response to determining that the projected route of the vehicle should be altered, the computer-executable program code portions include program code instructions configured to cause a signal to alter the projected route of the vehicle to be provided.

In an example embodiment, the computer code instructions are further configured to alter the projected route of the vehicle in response to the signal. In some embodiments, the signal to alter the projected route of the vehicle is provided to a driver of the vehicle and includes at least one of a direction, a speed, or the projected route of the emergency vehicle. In various embodiments, the computer code instructions are further configured to establish the level of criticality of the emergency. In such embodiments, the level of criticality of the emergency is based on at least one of a severity of the situation, a destination of an emergency vehicle, or the projected route of the emergency vehicle. In some embodiments, the received indication of the level of criticality of the emergency comprises different digital channels based on the level of criticality of the emergency.

In an example embodiment, an apparatus is provided for determining whether a vehicle should be re-routed in response to an emergency. The apparatus includes means for receiving an indication relating to a level of criticality of the emergency. The apparatus also includes means for determining a projected route for an emergency vehicle servicing the emergency. The apparatus further includes means for comparing the projected route of the emergency vehicle with a projected route of the vehicle. The apparatus still further includes means for determining whether the projected route of the vehicle should be altered. In such a case, the determination is based on at least one of the level of criticality of the emergency, a location of the emergency vehicle, or the comparison of the projected route of the emergency vehicle and the projected route of the vehicle. In response to determining that the projected route of the vehicle should be altered, the apparatus includes means for causing a signal to alter the projected route of the vehicle to be provided.

In an example embodiment, the apparatus also includes means for altering the projected route of the vehicle in response to the signal. In some embodiments, the signal to alter the projected route of the vehicle is provided to a driver of the vehicle and includes at least one of a direction, a speed, or the projected route of the emergency vehicle. In various embodiments, the apparatus also includes means for establishing the level of criticality of the emergency. In such embodiments, the level of criticality of the emergency is based on at least one of a severity of the situation, a destination of an emergency vehicle, or the projected route of the emergency vehicle.

In an example embodiment, the apparatus also includes means for causing the vehicle to perform a predetermined movement in an instance in which the projected route of the emergency vehicle is unavailable. In some embodiments, the means for receiving the indication of the level of criticality of the emergency include means for receiving the indication through different digital channels based on the level of criticality of the emergency.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having thus described certain example embodiments of the present disclosure in general terms, reference will hereinafter be made to the accompanying drawings, which are not necessarily drawn to scale, and wherein:

DETAILED DESCRIPTION

Some embodiments will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

A method, apparatus, and computer program product are provided in accordance with an example embodiment of the present invention for determining whether a vehicle should be re-routed in response to an emergency. In an example embodiment, the method, apparatus, and computer program are provided for facilitating autonomous and semi-autonomous driving in an environment that also includes emergency vehicles. Emergency vehicles emit a siren in order to notify surrounding vehicles that they are near. As described below, the method, apparatus, and computer program product of an example embodiment leverages advances in autonomous vehicles, and other driver assistance features to facilitate movement of emergency vehicles through traffic in critical situations. Although described in conjunction with autonomous and semi-autonomous vehicles, the method, apparatus, and computer program product of an example embodiment may also be utilized in conjunction with manually-driven vehicles.

By way of example, an ambulance may be in route to the hospital with a critical patient. The ambulance may use a siren to produce a sound that notifies the surrounding vehicles of the emergency. The siren may be equipped to use different digital channels depending on the criticality of the patient. A vehicle that is within the range of transmission of the siren may receive the siren and, in accordance with an example embodiment, may determine the level of criticality of the emergency from the siren, such as from the digital channel that is utilized. In addition to the level of criticality, the emergency vehicle may transmit, via the siren, information regarding the location, projected route, or projected destination of the ambulance. The method, apparatus, and computer program product of an example embodiment may then determine whether the vehicle may obstruct the route of the ambulance. If there is an overlap of routes between the emergency vehicle and the vehicle, then a determination of an alternate route for the vehicle may be made. The determination may be based on the criticality, location, and the like. If a determination to alter the route of the vehicle is made, the alteration may be signaled to the vehicle. An autonomous vehicle may respond to the signal by altering the speed or route without driver intervention. For semi-autonomous or non-autonomous vehicles, the signal may cause an indication to be provided to the driver that an alteration in the route is advised.

Figure 1:
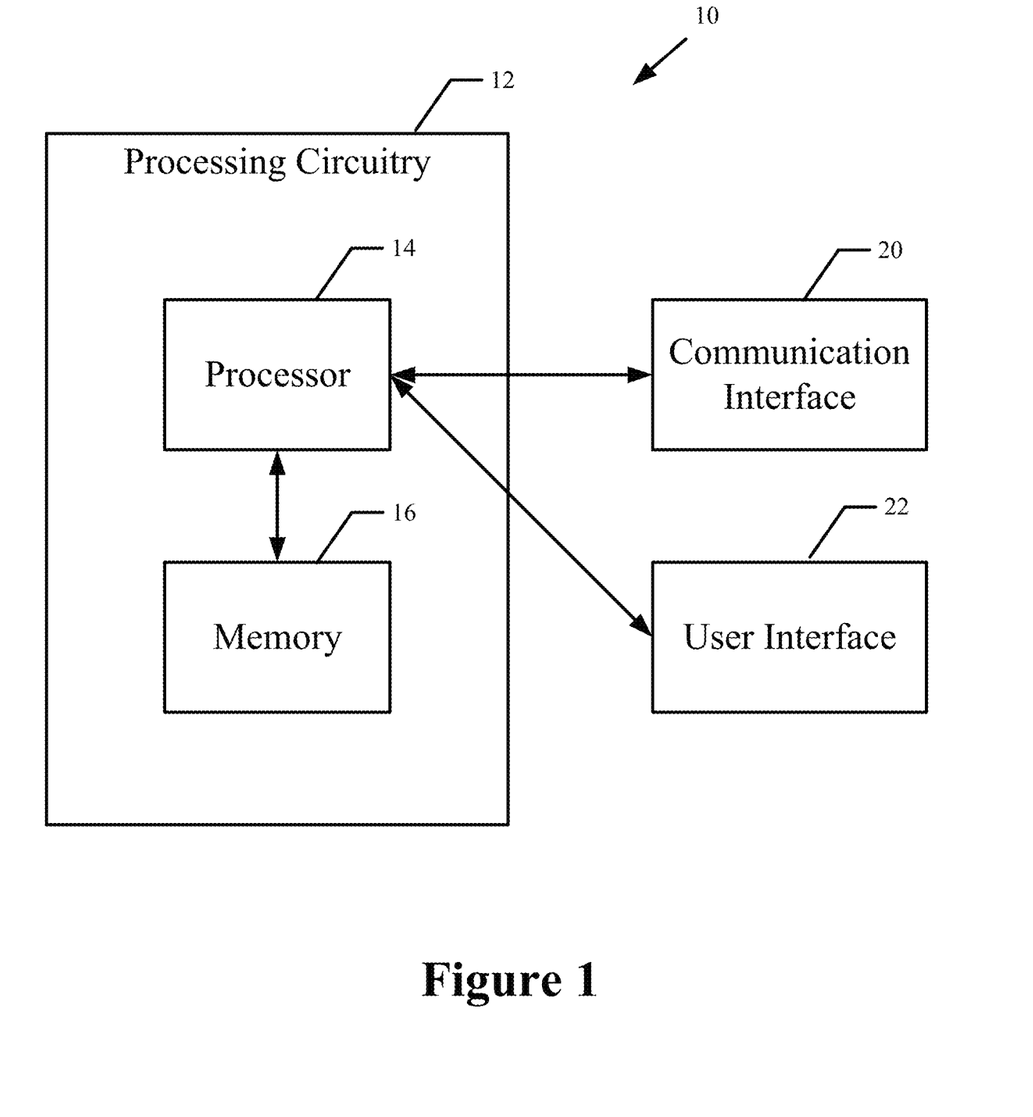
FIG. 1 is a block diagram of an apparatus configured in accordance with an example embodiment of the present disclosure.

FIG. 1 is a schematic diagram of an example apparatus configured for performing any of the operations in accordance with an example embodiment as described herein. Apparatus 10 may be embodied by or associated with any of a variety of computing devices that include or are otherwise associated with a device configured for providing an advanced driver assistance features. For example, the computing device may be an Advanced Driver Assistance System module (ADAS) which may at least partially control autonomous or semi-autonomous features of a vehicle; however embodiments of the apparatus may be embodied or partially embodied as a mobile terminal, such as a personal digital assistant (PDA), mobile telephone, smart phone, personal navigation device, smart watch, tablet computer, camera or any combination of the aforementioned and other types of voice and text communications systems. In one embodiment the apparatus 10 is embodied or partially embodied by an electronic control unit of a vehicle that supports safety-critical systems such as the powertrain (engine, transmission, electric drive motors, etc.), steering (e.g., steering assist or steer-by-wire), and braking (e.g., brake assist or brake-by-wire). Alternatively, the computing device may be a fixed computing device, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 10 may include, be associated with, or may otherwise be in communication with a processing circuitry 12, which includes a processor 14 and a memory device 16, a communication interface 20, and a user interface 22. In some embodiments, the processor 14 (and/or co-processors or any other processing circuitry assisting or otherwise associated with the processor) may be in communication with the memory device 16 via a bus for passing information among components of the apparatus. The memory device 16 may be non-transitory and may include, for example, one or more volatile and/or non-volatile memories. In other words, for example, the memory device 16 may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 14 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 14 may be configured to execute instructions stored in the memory device 16 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 10 of an example embodiment may also include or otherwise be in communication with a user interface 22. The user interface may include a touch screen display, a speaker, physical buttons, and/or other input/output mechanisms. In an example embodiment, the processor 14 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 16, and/or the like). The user interface may be embodied in the same housing as the processing circuitry, such as in a navigation system.

The apparatus 10 of an example embodiment may also optionally include a communication interface 20 that may be any means such as a device or circuitry embodied in either hardware or a combination of hardware and software that is configured to receive and/or transmit data from/to other electronic devices in communication with the apparatus, such as by near field communication (NFC) or other proximity-based techniques. Additionally or alternatively, the communication interface may be configured to communicate via cellular or other wireless protocols including Global System for Mobile Communications (GSM), such as but not limited to Long Term Evolution (LTE). In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication for vehicle to vehicle or vehicle to infrastructure wireless links. In example embodiments, the communication interface may receive and transmit data from vehicles nearby.

The apparatus 10 may support a mapping or navigation application so as to present maps or otherwise provide navigation or driver assistance, such as in an example embodiment in which map data is created or updated. For example, the apparatus 10 may provide for display of a map and/or instructions for following a route within a network of roads via a user interface 22. In order to support a mapping application, the computing device may include or otherwise be in communication with a geographic database, such as may be stored in memory 16. For example, the geographic database includes node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or Global Positioning System (GPS) data associations (such as using known or future map matching or geo-coding techniques), for example. Furthermore, other positioning technology may be used, such as electronic horizon sensors, radar, LiDAR, ultrasonic and/or infrared sensors.

In example embodiments, a navigation system including the user interface 22 may provide driver assistance to a manually operated vehicle traveling along a network of roadways. Other embodiments described herein may provide assistance for autonomous or semi-autonomous vehicle control. Autonomous vehicle control may include driverless vehicle capability where all vehicle functions are provided by software and hardware to reliably drive the vehicle along a path identified by the vehicle. Semi-autonomous vehicle control may be any level of driver assistance from adaptive cruise control, to lane-keep assist, or the like. The processor 14 may receive information from the map database 340 described below in more detail in reference to FIG. 3.

Autonomous driving has become a focus of recent technology with recent advances in machine learning, computer vision, and computing power able to conduct real-time sensing of a vehicle's condition and environment. With that, the interaction between vehicles on the road, both autonomous and otherwise is of interest. Such communication with surrounding vehicles promotes reliability and efficiency in the operation of vehicles. In this regard, a determination of where other vehicles are located and the route to be taken by the other vehicles is informative for planning a route, especially during emergency situations.

Figure 2:
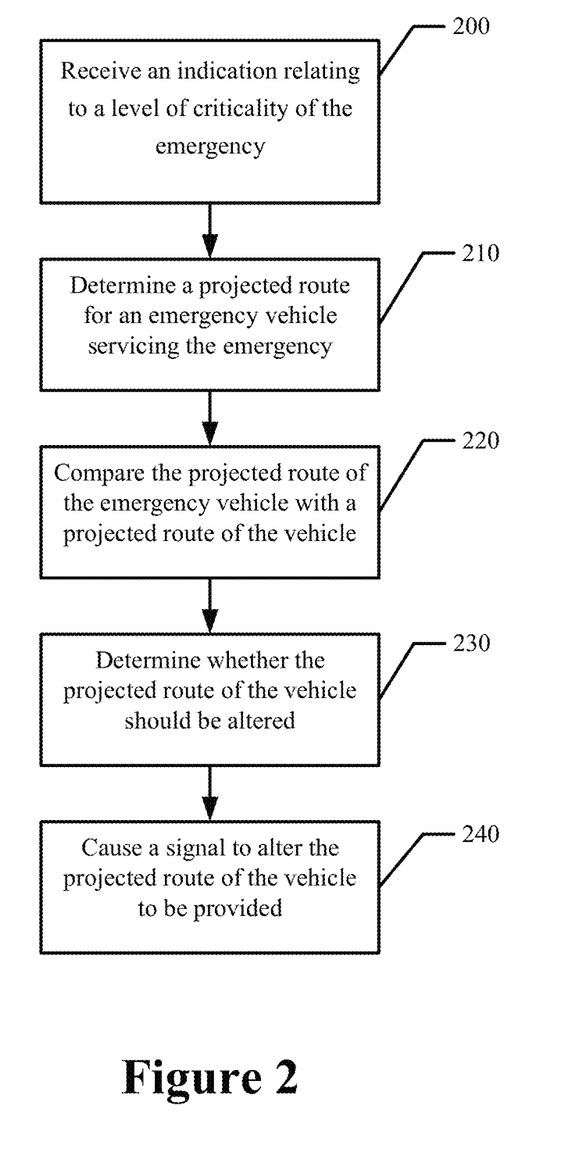
FIG. 2 is a flowchart illustrating the operations performed, such as by the apparatus of FIG. 1, in accordance with an example embodiment of the present disclosure.

Referring now to FIG. 2, the operations performed by the apparatus 10 of an example embodiment of the present invention includes means, such as the processing circuitry 12, the processor 14 or the like, for determining whether a vehicle should be re-rerouted in response to an emergency. In an example embodiment, detailed herein, the method, apparatus, and computer program product could be used in relation to vehicles including both autonomous vehicles and manually-operated vehicles. As shown in block 200 of FIG. 2, the apparatus 10 includes means, such as the processing circuitry 12, the processor 14 or the like, for receiving an indication relating to a level of criticality of the emergency. The indication is any notification that provides information relating to the level of criticality of an emergency. The level of criticality of an emergency may include information relating to at least one of the severity of the emergency situation, the destination of the emergency vehicle 310, or the projected route of the emergency vehicle. The severity of the emergency situation may be any information about the emergency. In some embodiments, the severity of the emergency situation may include the risk to a person (e.g., the condition of a patient being carried by an emergency vehicle). The indication may be in audible form and, in one embodiment, is included in a siren transmitted by an emergency vehicle while en route. The information provided by the indication may be derivable, such as based on the frequency, that is, the digital channel utilized by the siren. In this example embodiment, the digital channel via which the indication is received will indicate the level of criticality of the emergency. The indication may be received by a processor or communication interface. As detailed below, the processor or communication interface 20 may be carried by the vehicle 300. Alternatively, portions or the entirety of the communication interface and/or processor may be remote from the vehicle. In such embodiments, the information may transmitted to the vehicle through a wireless connection, such as the network 330 shown in, and discussed further in reference to, FIG. 3.

Referring now to Block 210 of FIG. 2, the apparatus 10 includes means, such as the processing circuitry 12, the processor 14 or the like, for determining a projected route for an emergency vehicle servicing the emergency. The projected route of the emergency vehicle may be determined from any information relating to the location of the emergency vehicle at a given time in the future. In some embodiments, the information relating to the projected route of the emergency vehicle may be explicitly provided. For example, the indication of the level of criticality of the emergency provided by an emergency vehicle may include its intended path to a destination. Alternatively, the information relating to the projected route of the emergency vehicle may be derivable by the apparatus, such as the processor. For example, the apparatus, such as the processor, may use historical data associated with prior routes taken by an emergency vehicle to determine the projected route of the emergency vehicle based on its current location and must probable intended location. In an example embodiment, the apparatus, such as the processor, may use the current speed and direction of travel for the emergency vehicle to determine the projected route of the emergency vehicle. Additionally or alternatively, the projected route may be based on additional information received from the emergency vehicle, such as the destination. In addition to or instead of historical data, the determination may be based on real time data. Real time data may be any information that relates to the current situation including information relating to the road conditions, current and planned vehicle routes, current and planned emergency vehicle routes, level of criticality of the emergency, or the like. For example, the apparatus, such as the processor and/or the communication interface, may be configured to determine the location of the emergency vehicle based on the Doppler Effect of the signals, e.g., the siren, received from the emergency vehicle. The determination of projected route may include the projected location over time, projected destination, and/or projected speed.

As noted above, the apparatus 10, such as the processor, may be configured to use historical data. Historical data may be any information that relates to previous situations including information relating to past traffic conditions, previous vehicle routes, previous emergency vehicle routes, or the like. For example, ambulances may often proceed along a certain route to a hospital that may not necessarily be determinable from real time data, but will be apparent from historical data. The processor 14 or the like may also use probability data to determine a projected route based on the historical data, such as by determining the likelihood that an emergency vehicle at a particular location will take one of several possible routes to a hospital. In some embodiments, the comparison may be based on both historical data and real time data (e.g., the processor uses the information received from the emergency vehicle to determine a projected route in combination with historical traffic data).

Referring now to Block 220 of FIG. 2, the apparatus 10 includes means, such as the processing circuitry 12, the processor 14 or the like, for comparing the projected route of the emergency vehicle with a projected route of a vehicle. The comparison may determine whether the projected route of a vehicle may interfere with the projected route of an emergency vehicle. In an example embodiment, the comparison may be based on the current direction and speed of both an emergency vehicle and another vehicle (e.g., an ambulance is traveling down the same street as the vehicle). The projected route of the vehicle may be provided by a navigation system of the vehicle. For example, the navigation system of an autonomous vehicle may include a predefined route. Or, the navigation system of a manually-operated vehicle may include a navigation system that defines the route, such as based upon interaction with the driver. In some embodiments, the projected route of the vehicle may be derivable by the processor using at least one of real time data or historical data, similarly to the determination of the projected route of the emergency vehicle discussed above. The apparatus, such as the processor, may be configured to compare the projected routes of the vehicle and an emergency vehicle to determine a potential overlap. This comparison may include statistical analysis of the projected route of the vehicle and the projected route of the emergency vehicle (e.g., the apparatus, such as the processor, may use the probability of multiple routes of the emergency vehicle and/or vehicle to compare the route of the emergency vehicle and the route of the vehicle to determine the likelihood that the routes will interfere by traveling along the same road in the same direction at the same time and then to determine whether the likelihood exceeds a predefined threshold indicative of interference). Additionally, in some embodiments, a mathematical determination may be used to determine the intersection point of the emergency vehicle and the vehicle (e.g., the determined intersection point may be based on the current speed of the emergency vehicle and/or the vehicle).

Referring now to Block 230 of FIG. 2, the apparatus 10 includes means, such as the processing circuitry 12, the processor 14 or the like, for determining whether the projected route of the vehicle should be altered. The determination may be based on at least one of the level of criticality of the emergency, the location of the emergency vehicle, the comparison of the projected route of the emergency vehicle and the projected route of the vehicle, and/or the type of road. In some embodiments, the level of criticality of the emergency may affect the type of alteration that will be proposed (e.g., a severe situation may require changing streets while a less severe situation may only require moving over on the same street). In some embodiments, the location of the emergency vehicle may affect the type of alteration needed (e.g., when an emergency vehicle is behind a vehicle, the vehicle may need to move over, while if the emergency vehicle is in front of the vehicle, the vehicle may simply reduce its speed). In an example embodiment, the comparison of the projected route of the emergency vehicle and the projected route of the vehicle may affect the type of alternations needed (e.g., when an emergency vehicle and a vehicle are projected to be at the same location at the same time, then an alteration may be needed for the vehicle). Additionally or alternatively, the type of road driven by the vehicle may affect the type of alterations needed (e.g., when travelling down a multilane highway, a vehicle may only have to move over one or more lanes, while on a one lane road, the vehicle may have to leave the roadway). The factors above and potentially additional factors may be combined. Each factor used may be weighted differently in determining whether an alteration of the projected route of the vehicle is needed from a combination of the factors. For example, in severe situations, it may be best to have any vehicle in the path of the emergency vehicle pull off of the road instead of altering its speed and therefore the apparatus, such as the processor, of an example embodiment may weight the level of criticality of the emergency more than other factors.

Referring now to Block 240 of FIG. 2, the apparatus 10 includes means, such as the processing circuitry 12, the processor 14 or the like, for causing a signal to alter the projected route of the vehicle to be provided. The signal provided may be any response by the apparatus, such as the processing circuitry 12, the processor 14 or the like, to the determination to alter the projected route of the vehicle. For autonomous vehicles, this signal may be configured to cause a vehicle to alter the route without driver interaction. In some embodiments, the user may be able to determine whether an autonomous vehicle will automatically alter the route or ask for the approval of an alteration from the user. For autonomous vehicles that retain human driver features, the apparatus, such as the processor, of an example embodiment may allow for a driver to override the alteration in route. In some embodiments, autonomous vehicles with a driver override may notify the driver of the impending alteration in route and permit driver override, if desired.

In some embodiments, for semi-autonomous or non-autonomous, manually-operated vehicles, the signal may be configured to cause a message to be communicated to the driver of the vehicle. The message may be provided in various forms and may notify the driver of a nearby emergency vehicle. As discussed in more detail in reference to FIG. 6, the message may be audible and/or visual. In some embodiments, the message may be communicated through pre-existing interfaces, such as a navigation system, infotainment system, or a speaker system. Additionally or alternatively, the message may be communicated through a dedicated interface element, such as a light on the dashboard. In various embodiments, the information provided in the message may include the projected route of the emergency vehicle, the recommended alteration to the route of the vehicle, the notification that an emergency vehicle is nearby, or the like. Notwithstanding the foregoing examples, there are many ways to communicate the signal to the driver.

Figure 3:
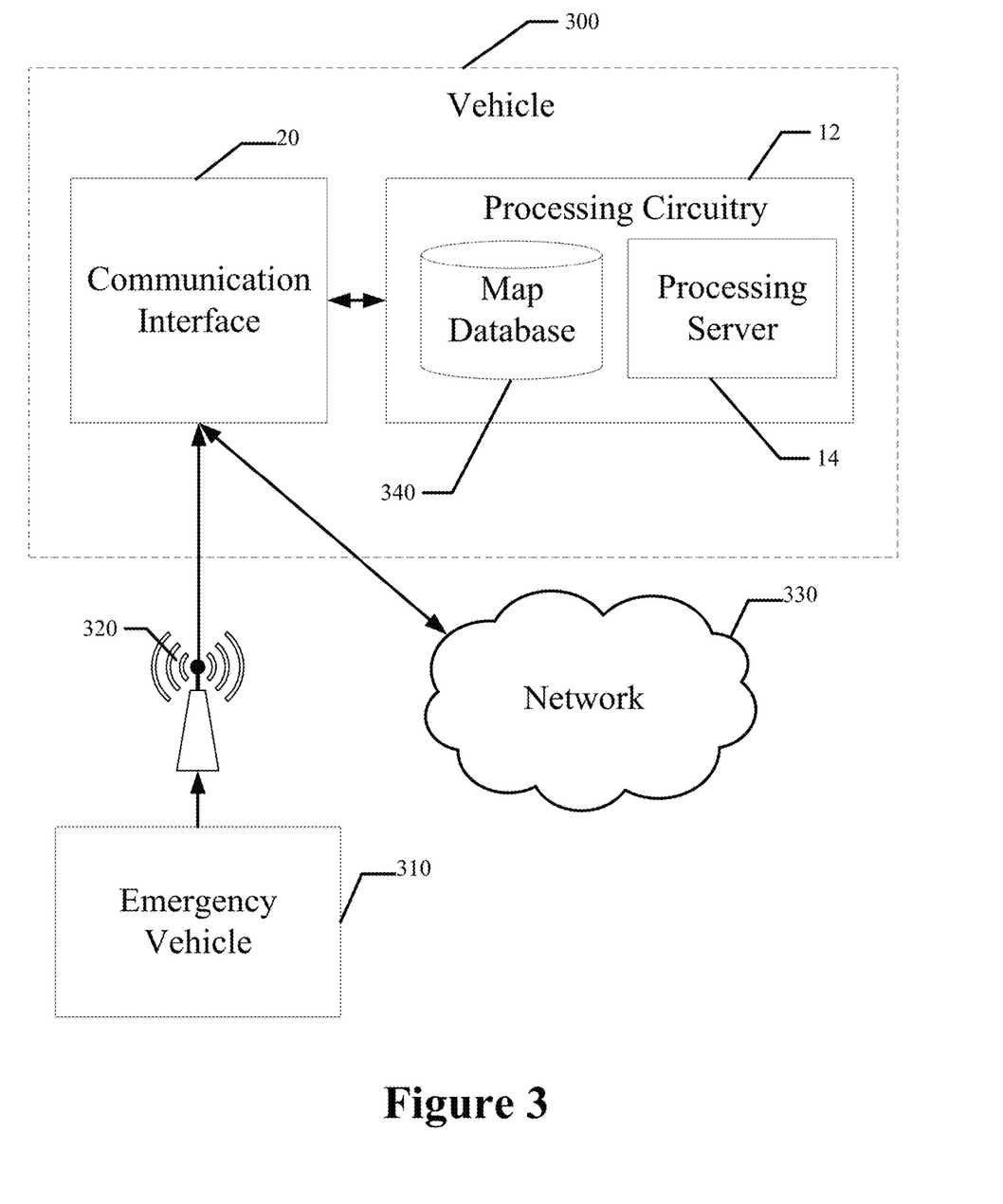
FIG. 3 illustrates a system including an example embodiment of the present disclosure.

Referring now to FIG. 3, an example system is provided in accordance with an embodiment of the present invention. In some instances, a vehicle 300 may be equipped with an example embodiment of the apparatus of FIG. 1. The vehicle may be an automobile, scooter, moped, bicycle, or the like. The vehicle may be fully autonomous. Alternatively, the vehicle may be manually-operated, at least in part, by a human. The vehicle may include or carry a communication interface 20 to gather indications transmitted by other vehicles, such as an emergency vehicle 310, on the road. An emergency vehicle may refer to any vehicle responding to an emergency including ambulances, fire trucks, first responder vehicles, police vehicles, and the like. In this regard, an emergency vehicle may include any vehicle that is equipped with a transmitter, such as a siren, configured to provide the information discussed herein. This communication interface 20 may be connected to, or a part of, a processing circuitry 12, which may contain, as detailed above, at least one processor 14 and at least one memory device 16.

In an example embodiment, the processing circuitry 12 may be connected to a user interface 22, such as a navigation display or screen. The user interface 22, as described in more detail above, may be any device that has the ability to notify a person in the vehicle of information, including audibly and/or visually. The processing circuitry of the example embodiment may also contain a processing server 12, either located remote from the vehicle 300 or within the vehicle as shown in FIG. 3. The processing server may include the processor 14 and the memory 16 of the embodiment of FIG. 1. This communication interface 20 may provide information to the processing circuitry 12 relating to the indication received by the vehicle 300. Although the processing circuitry of some embodiments is configured to operate independently of network connectivity, the processing circuitry of other embodiments utilizes the communication interface 20 to communicate with a network 330 so as to access various network resources. The network 330 may be any of various wireless communication networks, such as cellular, Wi-Fi, internet, local area networks, or the like.

In some embodiments, the emergency vehicle may also be configured with an apparatus similar to the apparatus of FIG. 1, such that the emergency vehicle may have a processing circuitry 12, such as a processor 14 and a memory device 16, a communication interface 20, and a user interface 22. The emergency vehicle, via the processor, may determine the criticality of the emergency situation and/or the appropriate indication to provide for a given criticality.

In various embodiments, such as the one shown in FIG. 3, an emergency vehicle 310 provides, via a transmitter 320, the indication, which is received by the communication interface 20. The communication interface 20 may be carried by a vehicle 300. This indication may be transmitted through a wireless connection. This indication may be in the form of sound or other indication types. The transmitter may be any device that transmits an indication to its surroundings. In some embodiments, the transmitter 320 may be carried by the emergency vehicle. In other embodiments, the emergency vehicle may communicate with a transmitter remote from the emergency vehicle in order to cause the transmitter to provide the desired indication. The transmitter may be in the form of a siren. In an example embodiment, the indication may be derivable by the apparatus based on the digital channel of the siren that is used. For example, traditional sirens for emergency vehicles operate at 960 Hz and 770 Hz and may repeat every 1.3 seconds. In addition to the traditional sirens, other alarms and sirens may fall into a frequency of 1 kHz to 3 kHz. In an example embodiment of the present invention, the digital channel may be different than both traditional sirens and other known sirens or alarms depending on the level of criticality of the emergency (e.g., an ambulance with a patient who has a heart attack and needs to get to the hospital at the earliest possible time may have the siren set to 850 Hz and 650 Hz with signals at those frequencies alternately repeated every 1.3 seconds). The number of frequencies received by the vehicle may affect the ability to pinpoint the sound (e.g., the more frequencies that are received may result in a more accurate pinpointing of the sound), therefore, the amount of time that the frequencies are repeated may be adjusted (e.g., a shorter length of time per frequency allows for more frequencies to be received). The changes in digital channel may be discernable to humans. Alternatively, the changes in digital channel may not be discernable by humans and is only detectable by a processor 14 or the like. In some embodiments, the transmitter may be embodied as more than one transmitter (e.g., a first transmitter may serve as a traditional siren, while a second transmitter may provide information relating to the level of criticality based by using a different digital channel).

Additionally, the emergency vehicle may provide information relating to the indication that is transmitted to assist the processing circuitry 12, such as the processor, the processing server or the like, in determining whether an alteration in the route of the vehicle should be made (e.g., providing information to the processor to assist in determining the digital channel that identifies various types of emergencies).

The processor may be configured to determine the level of criticality of the emergency based on the digital channel used. In an example embodiment, a first digital channel may be for life-threatening situations, which indicates that the vehicle 300 will need to make the most extreme alteration in route, such as proceeding to a different road. Alternatively, a second digital channel may be for transport situations that are not as time sensitive, which indicates that the vehicle should make a more modest alteration in route, such as slowing if the routes of the vehicle and emergency vehicle are determined to interfere. In some embodiments, the indication from the emergency vehicle may use another type of communication method, such as vehicle to vehicle communication using dedicated short range communications (DSRC) for short distance communications (e.g., less than 1000 feet). In some embodiments, the processing circuitry 12 may provide a signal to the driver of a manually-operated or semi-autonomous vehicle that an alteration is proper, as shown and discussed further below in an example embodiment in FIG. 6.

In some instances, there may be multiple vehicles configured in accordance with an example embodiment of the present disclosure that receive the indication from the transmitter 320 simultaneously. For example, on a heavy trafficked street, all of the vehicles within a certain range may receive the indication from the transmitter 320. In some embodiments, the multiple vehicles configured in accordance with an example embodiment may operate independently from other vehicles (e.g., the multiple vehicles may each operate independently without communication with the other vehicles). In other embodiments, the method, apparatus, and computer program product may work together across vehicles to provide indications to the various vehicles about their routes. In these embodiments, the information included in the indications may be specialized to each vehicle, such as an alteration in route, or may be general, such as an indication that an emergency vehicle is currently on a given street. In some embodiments, the alteration of route may include speeding up or slowing down the current or projected vehicle speed in order to avoid obstructing the emergency vehicle. For example, when an emergency vehicle is going to be travelling through an intersection, a vehicle coming to the intersection from a different direction may be able to slow its speed slightly to allow the emergency vehicle to pass before entering the intersection. The alteration in route may be tailored based on a desired level of reliability or efficiency. In some embodiments, a single vehicle may receive multiple sirens from multiple emergency vehicles simultaneously. In such a case, the vehicle equipped with an example embodiment may perform calculations for all sirens independently and respond accordingly.

The processing server 14 may be in communication with a map database 340. The map database may be defined by the memory device 16, or may be remote, such as in the network 330, and connected to the processing circuitry, such as via the communication interface 20. In an example embodiment, the map database may provide information that may assist the apparatus to determine if an alteration in route of the vehicle is needed. The map database may include node data, road segment data or link data, point of interest (POI) data, or the like. The map database may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as hospitals, police stations, fire stations, fueling stations, hotels, restaurants, museums, stadiums, offices, auto repair shops, buildings, stores, parks, etc. The map database can include data about the POIs and their respective locations in the POI records. The map database may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database can include event data (e.g., traffic incidents, construction activities, scheduled events, unscheduled events, etc.) also known as a context associated with the POI data records or other records of the map database. The map database may include data about emergency vehicles (e.g., typical routes, activities, speeds, high usage areas) with the POI data or other portions of the map database.

The map database 340 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device for example. The navigation-related functions can correspond to vehicle navigation, pedestrian navigation, or other types of navigation.

As mentioned above, the map database 340 may be a master geographic database stored or accessible on the server side. However, in alternate embodiments, a client side map database may represent a compiled navigation database that may be used in or with end user devices to provide navigation and/or map-related functions. For example, the map database may be used with the user equipment to provide an end user with navigation features. In such a case, the map database can be downloaded or stored on the user equipment which can access the map database through a wireless or wired connection, such as via a processing server 14 and/or the network 330, for example.

Additionally or alternatively, the map database 340 may include historical data relating to past traffic conditions, previous vehicle routes, previous emergency vehicle routes, or the like. This data may be used to determine the projected route of an emergency vehicle. For example, in situations where there is a high level of criticality, an ambulance may take the quickest route to a hospital, while in a lower level of criticality, the ambulance may take a longer, safer route. This historical data may be updated or remain static. The map database may also be a compilation of databases used to aid the processing server 14 in determining whether the vehicle should alter the projected route. The map database may be contained in the processing circuitry 12, as shown in FIG. 3, or may be connected to the processing circuitry through the network 330 or communication interface 20. Additionally, the map database may be carried by the vehicle 300 or may be remote from the vehicle.

Figure 4:
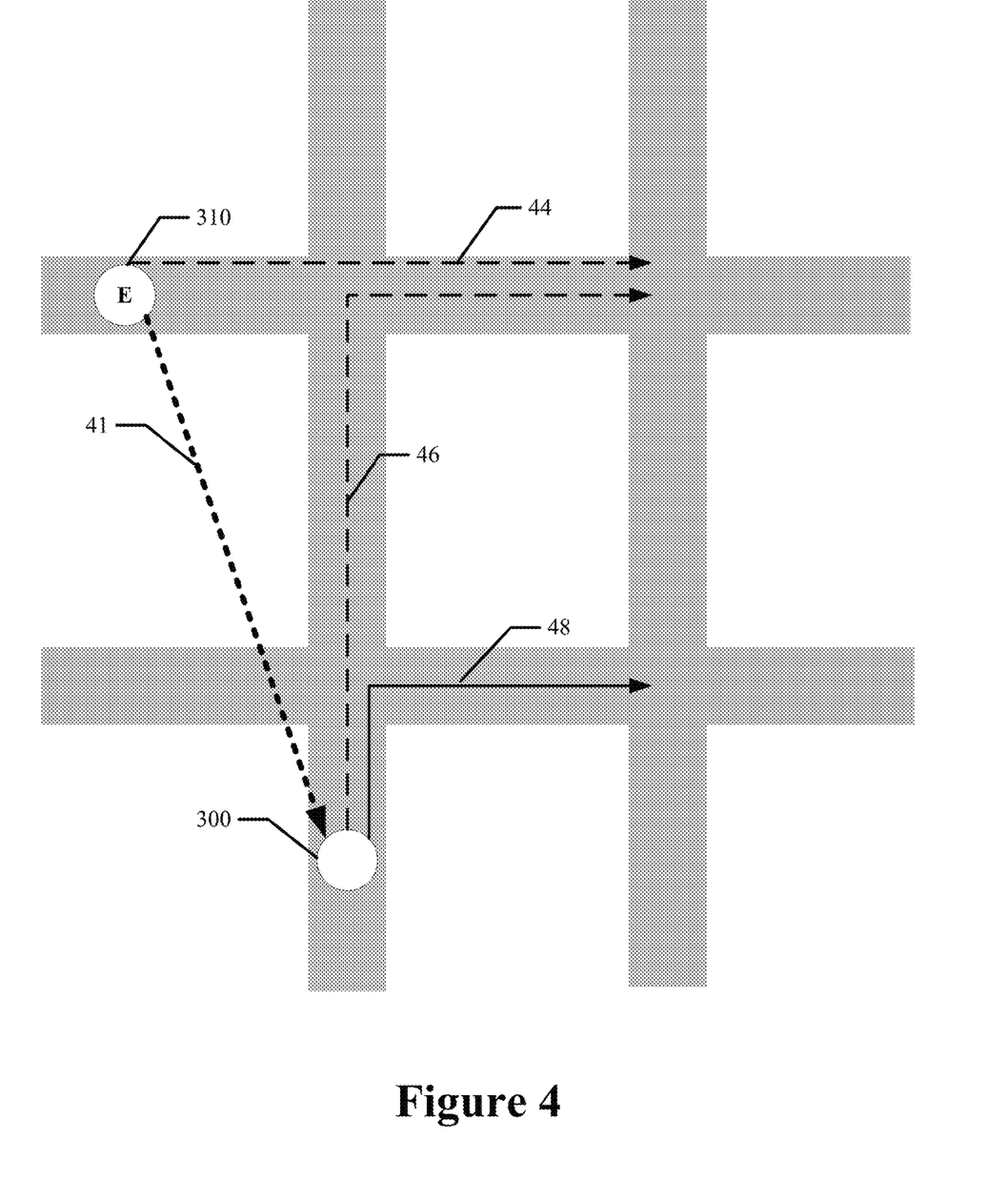
FIG. 4 is a map illustrating a projected and actual route of a vehicle equipped in accordance with an example embodiment of the present disclosure.

Referring now to FIG. 4, a map is provided illustrating an example route of a vehicle that may utilize an example embodiment of the present disclosure. The map may be displayed to the vehicle, via a user interface 22 (e.g., a vehicle navigation system). In an example in accordance with FIG. 4, a vehicle 300, equipped with an example embodiment of the present invention, may have an initial projected route 46. An emergency vehicle 310 traveling nearby may transmit an indication 41 of the level of criticality of an emergency to a given area. Vehicles equipped with an example embodiment of the present invention within a certain distance of the emergency vehicle may be capable of receiving the indication. The distance that the indication is transmitted may be determined by the type and strength of transmitter 320, as well as the environmental surrounding the emergency vehicle. The communication interface 20 may then receive the indication from the transmitter. Based on the received indication, the processor 14 or the like may determine the level of criticality of the emergency. In some embodiments, based on the indication, the processor or the like may determine the projected route of the emergency vehicle. As discussed above, the projected route of the emergency vehicle may be based on information relating to the location of the emergency vehicle at a given time and/or in the future. This may include the current location, current speed, future location, destination, or the like. Additionally or alternatively, the indication from the ambulance may explicitly designate the projected route (e.g., an ambulance uses a specific digital channel to denote that they are taking a specific route to the hospital).

Figure 6:
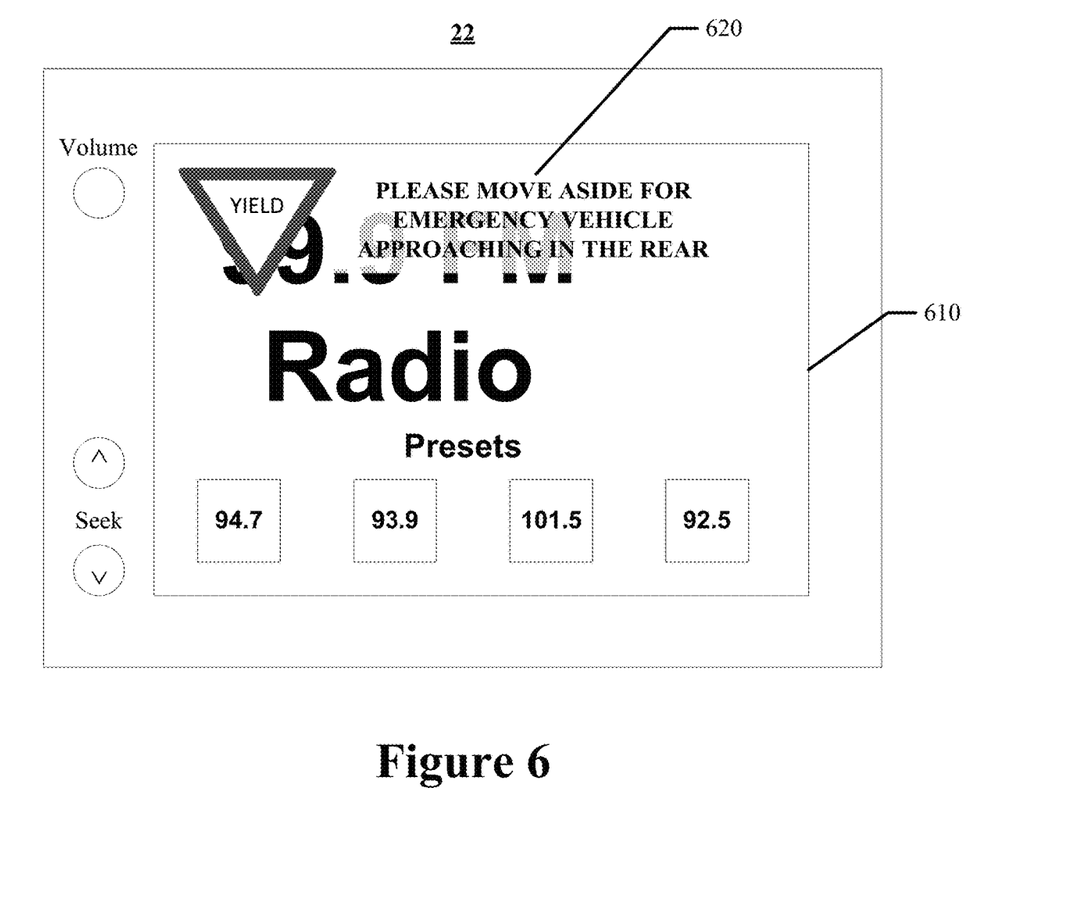
FIG. 6 illustrates an example of a signal being displayed via a vehicle's infotainment center in accordance with an example embodiment of the present disclosure.

In the example embodiment shown in FIG. 4, the projected route of the vehicle 46 and the projected route of the emergency vehicle 44 conflict, such as by travelling on the same road in the same direction at the same time. At this point, the processor 14 or the like may be configured to make a determination of the alterations to the route of the vehicle that will be proposed to avoid obstructing the emergency vehicle. The determination to alter the route of the vehicle may be based on at least one of the projected route of the vehicle, the projected route of the emergency vehicle, the level of criticality of the emergency, or the current location of the emergency vehicle 310. The apparatus 10, such as the processor 14, the communication interface 20, the user interface 22 or the like, may then be configured to provide a signal which may result in the route of the vehicle being altered. For example, as shown, the apparatus may cause the vehicle to change to an altered route 48 to avoid obstructing the emergency vehicle. Alternatively or additionally, the vehicle may remain on the same road(s), but may have an alteration of speed and/or lane. For autonomous vehicles, the processor may direct the vehicle to alter the route automatically. In other embodiments, such as in conjunction with manually-operated vehicles, the alterations to the route may be communicated to the driver. In these example embodiments, the signal to alter the route of the vehicle may be a visual and/or audible communication to the driver. For example, if a driver is using a navigation system, then the route shown on the navigation screen may be altered. In some embodiments, a vehicle may display a warning, such as shown in FIG. 6, to alter route on an infotainment system screen and/or may have a message indicating the altered route audibly reproduced through the speaker system. In an example embodiment, the signal may be communicated to the driver using a mobile device.

Figure 5A:
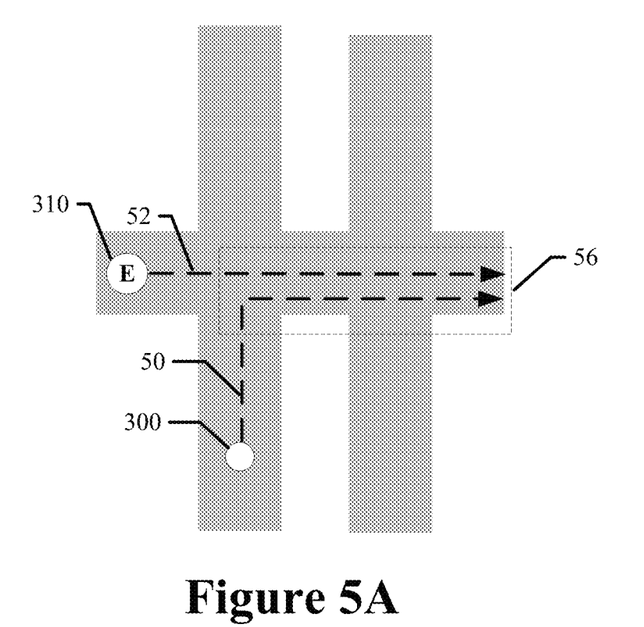
FIGS. 5A and 5B are maps of the same region before and after a vehicle, equipped with an example embodiment of the present invention, receives an indication that an emergency vehicle is nearby.
Figure 5B:
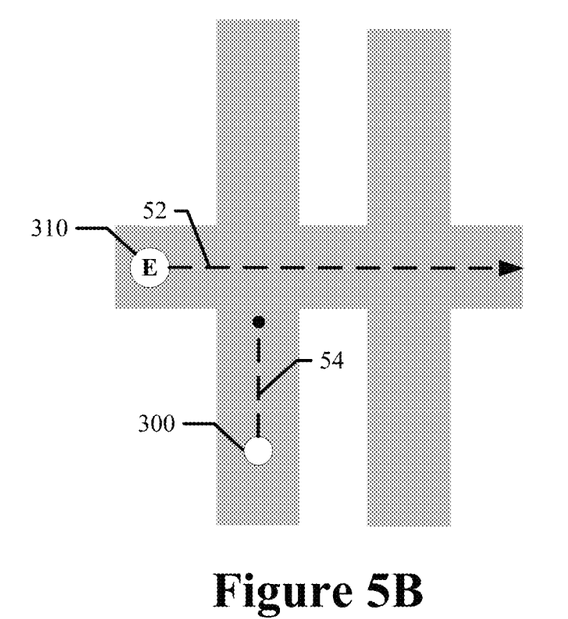

Referring now to FIGS. 5A and 5B, a map is provided illustrating a vehicle 300 configured in accordance with an example embodiment of the present disclosure. The vehicle is illustrated before and after receiving an indication from a nearby emergency vehicle 310. Referring now to FIG. 5A, the vehicle is travelling along a projected route 50, which includes a right turn at the next intersection. The projected route of the vehicle, as discussed in more detail throughout, may be provided to the apparatus or derived by the apparatus. In this example, the vehicle also receives an indication from an emergency vehicle, such as an ambulance. Based on the indication from the emergency vehicle, the apparatus, such as the processor 14, may determine that the projected route of the emergency vehicle 52 is along the same street that vehicle is planning to turn onto at the next intersection. Once the example apparatus, such as the processor, determines that the emergency vehicle and the vehicle have projected routes 56 that overlap, the apparatus, such as the processor, may determine an alteration to make to the route of the vehicle. This determination may be based at least partially on the overlapping projected routes. Additionally or alternatively, the determination may also be based on the criticality of the emergency, the current and/or historical traffic conditions, historical routes of emergency vehicles, and the like.

Now referring to FIG. 5B, as a result of the determination to alter the route, the route of the vehicle 54 is changed. The change of the route may be completed either by the apparatus itself, an additional processor of an autonomous or semi-autonomous vehicle, or a driver of a manually-operated vehicle. As discussed above, vehicles that operate autonomously may be able to alter the route with no driver interaction, while non-autonomous or semi-autonomous vehicles may communicate to a driver the proposed to alter the route. In the present example, the apparatus, such as the processor, determined that the vehicle 300 should stop before the intersection to allow the emergency vehicle 310 to pass. The altered route of the vehicle may be displayed to the vehicle using user interface 22 (e.g., a map similar to the map shown in FIG. 5B may be displayed on a navigation system screen). Alternatively or additionally, the driver may not be shown this map and instead the instructions to stop before the intersection may be provided audibly or otherwise. After the emergency vehicle has passed through the intersection, the apparatus, such as the processor, may be configured to direct the resumption of regular driving conditions (e.g., the vehicle may be instructed to return to the previous route 50 to a desired destination, if using a navigation system).

Referring now to FIG. 6, an example signal to a vehicle, such as a manually-operated vehicle, is shown with the signal alteration to the projected route of a vehicle. In this example, the signal 620 indicative of a proposed change in the route may be given to a driver using a user interface 22, such as an infotainment center. This signal may be visual, as shown. Alternatively or additionally, the signal may be audible, such as through the speaker system. A visual signal may be displayed in any location that may be in the field of vision for the driver. For example, as shown in FIG. 6, the signal may be displayed on an infotainment center screen 610, such as shown in FIG. 6. In some embodiments, the signal may be displayed on the dashboard of a vehicle or in a heads up display. The signal may be integrated into existing interfaces, such as shown in FIG. 6 where the signal is displayed by the existing screen 610. Additionally or alternatively, the signal may have a dedicated indicator. The signal itself may offer varying amounts of information relating to the location of the emergency vehicle, the projected route of the emergency vehicle, the level of criticality of the emergency, and the like. In some embodiments, the signal may give the same warning any time that an emergency vehicle is near (e.g., a light is displayed any time a vehicle is in the projected path of an emergency vehicle).

In an example embodiment, such as the one shown in FIG. 6, the driver of a vehicle may be using the infotainment center screen 610 to view the radio station currently playing. When the processor 14 or the like receives an indication of the level of criticality, such as a siren, the apparatus, such as the processor, may then determine that an alteration of route should be proposed for the vehicle. In this example embodiment, a human driver receives the signal 620 to alter the route of the vehicle. This signal is displayed on the infotainment center screen in this example embodiment, such as by overlaying the radio information. Additionally or alternatively, an audible signal may also be played through the speaker system. The signal, in an example embodiment, informs the driver that an emergency vehicle is approaching from the rear. Therefore, the driver may then alter the position of the vehicle, such as in accordance with a proposed alteration of the route, to avoid obstructing the emergency vehicle. Additional information about the emergency vehicle may also optionally be provided by the signal, such as the speed, location, size, destination, or the like. The notification of some embodiments may also indicate if multiple emergency vehicles are approaching.

In addition to the example shown in FIG. 6, the same, or similar, method of communication may be used in conjunction with autonomous vehicles to alert passengers of alterations in the route of the vehicle. For example, a passenger in an autonomous vehicle may be alerted to avoid confusion or panic when the vehicle makes sudden changes to the direction or speed of travel. The communication may be similar to the communication to the driver of a non-autonomous vehicle, but may include information about the changes to the route that are actively being made.

The method, apparatus, and computer program product of an example embodiment leverage the increasing amount of available information relating to vehicles and their routes to facilitate travel of an emergency vehicle in an efficient and reliable manner to the intended destination, such as a hospital. Moreover, the method, apparatus, and computer program product are configured to operate with various types of vehicles, such as autonomous vehicles and manually-operated vehicles, to avoid obstructing emergency vehicles, while also altering the route of the other vehicles only to the extent necessary, thereby not unnecessarily delaying the other vehicle.

As described above, FIG. 2 illustrates a flowchart of an apparatus 10, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 16 of a software development test platform employing an embodiment of the present invention and executed by the processing circuitry 12, the processor 14 or the like of the software development test platform. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for determining whether a vehicle should be re-routed in response to an emergency, the method comprising:
    detecting, via one or more audio sensors, a siren emitted by an emergency vehicle, the siren characterized by at least one emission frequency;
    based at least in part on the at least one emission frequency, determining, by a processor, a level of criticality of the emergency that the emergency vehicle is servicing;
    determining, by the processor, a projected route for the emergency vehicle servicing the emergency;
    comparing, by the processor, the projected route of the emergency vehicle with a projected route of the vehicle;
    determining, by the processor, whether the projected route of the vehicle should be altered, wherein the determination is based on at least one of the level of criticality of the emergency, a location of the emergency vehicle as determined based at least in part on the detected siren, or the comparison of the projected route of the emergency vehicle and the projected route of the vehicle; and
    in response to determining that the projected route of the vehicle should be altered, causing the projected route of the vehicle, as altered, to be provided.

2. The method according to claim 1 further comprising:
    causing a signal to alter the projected route of the vehicle to be provided; and
    altering the projected route of the vehicle in response to the signal.

3. The method according to claim 1, wherein the projected route of the vehicle, as altered, is provided to a driver of the vehicle and includes at least one of a direction, a speed, or the projected route of the emergency vehicle.

4. The method according to claim 1 further comprising determining the at least one emission frequency based on the detection of the siren and establishing the level of criticality of the emergency based on the at least one emission frequency.

5. The method according to claim 4, wherein the level of criticality of the emergency is based on at least one of a severity of the situation, a destination of an emergency vehicle, or the projected route of the emergency vehicle.

6. The method according to claim 1 further comprising causing the vehicle to perform a predetermined movement in an instance in which the projected route of the emergency vehicle is unavailable.

7. The method according to claim 1, wherein receiving the indication of the level of criticality of the emergency comprises receiving the indication through different digital channels based on the level of criticality of the emergency.

8. The method of claim 1, wherein the location of the emergency vehicle is determined based at least in part on a detected Doppler effect on the at least on emission frequency.

9. An apparatus for determining whether a vehicle should be re-routed in response to an emergency, the apparatus comprising at least one processor and at least one non-transitory memory including computer program code instructions, the computer program code instructions configured to, when executed, cause the apparatus to:
    detect, via one or more audio sensors, a siren emitted by an emergency vehicle, the siren characterized by at least one emission frequency;
    based at least in part on the at least one emission frequency, determine a level of criticality of the emergency that the emergency vehicle is servicing;
    determine a projected route for the emergency vehicle servicing the emergency;
    compare the projected route of the emergency vehicle with a projected route of the vehicle;
    determine whether the projected route of the vehicle should be altered,
    wherein the determination is based on at least one of the level of criticality of the emergency, a location of the emergency vehicle as determined based at least in part on the detected siren, or the comparison of the projected route of the emergency vehicle and the projected route of the vehicle; and in response to determining that the projected route of the vehicle should be altered, cause the projected route of the vehicle, as altered, to be provided.

10. The apparatus according to claim 9, wherein the computer program code instructions are further configured to, when executed, cause the apparatus to:

cause a signal to alter the projected route of the vehicle to be provided; and alter the projected route of the vehicle in response to the signal.

11. The apparatus according to claim 9, wherein the projected route of the vehicle, as altered, is provided to a driver of the vehicle and includes at least one of a direction, a speed, or the projected route of the emergency vehicle.

12. The apparatus according to claim 9, wherein the computer program code instructions are further configured to, when executed, cause the apparatus to determine the at least one emission frequency based on the detection of the siren and establish the level of criticality of the emergency based on the at least one emission frequency.

13. The apparatus according to claim 12, wherein the level of criticality of the emergency is based on at least one of a severity of the situation, a destination of an emergency vehicle, or the projected route of the emergency vehicle.

14. The apparatus according to claim 9, wherein the computer program code instructions are further configured to, when executed, cause the apparatus to perform a predetermined movement in an instance in which the projected route of the emergency vehicle is unavailable.

15. The apparatus according to claim 9, wherein the received indication of the level of criticality of the emergency comprises different digital channels based on the level of criticality of the emergency.

16. The apparatus of claim 9, wherein the computer program code instructions are further configured to, when executed, operate the vehicle responsive to the projected route, as altered.

17. A computer program product comprising at least one non-transitory computer-readable storage medium having computer-executable program code portions stored therein, the computer-executable program code portions comprising program code instructions configured to:

detect, via one or more audio sensors, a siren emitted by an emergency vehicle, the siren characterized by at least one emission frequency;

based at least in part on the at least one emission frequency, determine a level of criticality of the emergency that the emergency vehicle is servicing;

determine a projected route for the emergency vehicle servicing the emergency;

compare the projected route of the emergency vehicle with a projected route of a vehicle;

determine whether the projected route of the vehicle should be altered, wherein the determination is based on at least one of the level of criticality of the emergency, a location of the emergency vehicle as determined based at least in part on the detected siren, or the comparison of the projected route of the emergency vehicle and the projected route of the vehicle; and in response to determining that the projected route of the vehicle should be altered, cause the projected route of the vehicle, as altered, to be provided.

18. The computer program product according to claim 17, wherein the program code instructions are further configured to:

cause a signal to alter the projected route of the vehicle to be provided; and alter the projected route of the vehicle in response to the signal.

19. The computer program product according to claim 17, wherein the projected route of the vehicle, as altered, is provided to a driver of the vehicle and includes at least one of a direction, a speed, or the projected route of the emergency vehicle.

20. The computer program product according to claim 17, wherein the program code instructions are further configured to establish the level of criticality of the emergency.

21. The computer program product according to claim 20, wherein the level of criticality of the emergency is based on at least one of a severity of the situation, a destination of an emergency vehicle, or the projected route of the emergency vehicle.

22. The computer program product according to claim 17, wherein the received indication of the level of criticality of the emergency comprises different digital channels based on the level of criticality of the emergency.

23. The computer program product of claim 17, wherein the program code instructions are further configured to operate the vehicle responsive to the projected route, as altered.

* * * * *